(12) United States Patent
Johnson et al.

(10) Patent No.: US 12,214,884 B2
(45) Date of Patent: Feb. 4, 2025

(54) EXPANDABLE LAVATORY AND CABIN CONFIGURATION INCLUDING DEDICATED SEATING AREA AND EXPANDABLE LAVATORY

(71) Applicant: B/E Aerospace, Inc., Winston-Salem, NC (US)

(72) Inventors: Glenn A. Johnson, Rural Hall, NC (US); Ann Tucker, Belews Creek, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 316 days.

(21) Appl. No.: 17/955,363

(22) Filed: Sep. 28, 2022

(65) Prior Publication Data

US 2023/0103908 A1    Apr. 6, 2023

Related U.S. Application Data

(60) Provisional application No. 63/251,399, filed on Oct. 1, 2021.

(51) Int. Cl.
*B64D 11/02* (2006.01)
*A61G 3/08* (2006.01)
(Continued)

(52) U.S. Cl.
CPC ........ *B64D 11/0601* (2014.12); *A61G 3/0808* (2013.01); *B64D 11/02* (2013.01);
(Continued)

(58) Field of Classification Search
CPC . B64D 11/02; B64D 2011/0046; B63B 29/14; B60R 15/02; B60R 15/04;
(Continued)

(56) References Cited

U.S. PATENT DOCUMENTS

| 4,266,822 A | 5/1981 | Barecki et al. |
| 4,492,403 A | 1/1985 | Blomgren et al. |

(Continued)

FOREIGN PATENT DOCUMENTS

| CA | 2737577 C | 2/2019 |
| DE | 29924487 U1 | 6/2003 |

(Continued)

*Primary Examiner* — Christopher D Hutchens
*Assistant Examiner* — Michael A. Fabula
(74) *Attorney, Agent, or Firm* — Suiter Swantz IP (57) ABSTRACT

An expandable lavatory and an aircraft cabin configuration including the same. First, second and third walls form the lavatory interior and the third wall is repositionable to expand the lavatory interior footprint to accommodate a wheelchair. The third wall carries a door deployable when the third wall is in the expanded configuration such that the wheelchair can access the lavatory interior via an exit pathway. A first door positioned in the second wall provides access to the lavatory interior via a longitudinal aisle. In some embodiments, a wheelchair securement area is positioned longitudinally aligned with the second door, when the second door is deployed, such that wheelchair access to the lavatory is provided through second door when the lavatory is in the expanded configuration.

15 Claims, 10 Drawing Sheets

(51) Int. Cl.
   *B64D 11/06*   (2006.01)
   *E06B 3/48*   (2006.01)
(52) U.S. Cl.
   CPC ...... *B64D 11/0606* (2014.12); *B64D 11/0691* (2014.12); *E06B 3/481* (2013.01)
(58) Field of Classification Search
   CPC ...... B61D 35/002; B61D 35/005; A47K 3/32; A47K 3/325
   See application file for complete search history.

(56) References Cited

U.S. PATENT DOCUMENTS

| | | | | |
|---|---|---|---|---|
| 4,589,463 | A * | 5/1986 | Ryan | E06B 3/48 |
| | | | | 296/156 |
| 6,113,325 | A | 9/2000 | Craft | |
| 6,293,612 | B1 * | 9/2001 | Crean | B60P 3/36 |
| | | | | 296/176 |
| 6,505,873 | B1 * | 1/2003 | Crean | B60P 3/34 |
| | | | | 340/425.5 |
| 6,615,421 | B2 * | 9/2003 | Itakura | B64D 11/02 |
| | | | | 4/664 |
| 7,328,927 | B1 * | 2/2008 | Crean | B60P 3/34 |
| | | | | 296/165 |
| 7,866,603 | B2 | 1/2011 | Cooper et al. | |
| 9,045,231 | B2 | 6/2015 | Swain | |
| 9,051,052 | B2 | 6/2015 | Boren | |
| 9,139,303 | B2 | 9/2015 | Bechtold et al. | |
| 9,180,969 | B2 | 11/2015 | Kunze et al. | |
| 9,308,997 | B2 | 4/2016 | Scown et al. | |
| 9,561,854 | B2 * | 2/2017 | Schliwa | B64D 11/04 |
| 9,688,407 | B2 * | 6/2017 | McIntosh | B64D 11/02 |
| 9,708,062 | B2 | 7/2017 | Grant et al. | |
| 9,714,094 | B2 | 7/2017 | Ivester et al. | |
| 10,287,016 | B2 | 5/2019 | Seibt | |
| 10,392,096 | B2 * | 8/2019 | Guering | B64D 45/0026 |
| 10,426,674 | B2 | 10/2019 | Bijl et al. | |
| 10,870,489 | B2 | 12/2020 | Dowty et al. | |
| 10,933,968 | B2 * | 3/2021 | Heidtmann | B64D 11/04 |
| 10,953,987 | B2 | 3/2021 | Johnson et al. | |
| 11,299,250 | B2 * | 4/2022 | Movsesian | B64D 45/0028 |
| 11,299,272 | B2 * | 4/2022 | Seibt | B64D 11/02 |
| 11,377,215 | B1 * | 7/2022 | Moe | B64D 11/0639 |
| 11,572,170 | B2 * | 2/2023 | Dowty | B64D 11/0691 |
| 12,065,245 | B2 * | 8/2024 | Eisele | E06B 3/921 |
| 2009/0065641 | A1 * | 3/2009 | Koehn | B64C 1/1469 |
| | | | | 244/129.5 |
| 2012/0261509 | A1 * | 10/2012 | Grant | B64D 11/02 |
| | | | | 4/664 |
| 2013/0123075 | A1 | 5/2013 | Hmelnitski | |
| 2013/0206907 | A1 * | 8/2013 | Burrows | B64D 11/02 |
| | | | | 244/118.5 |
| 2013/0280002 | A1 | 10/2013 | Girardin et al. | |
| 2014/0123571 | A1 * | 5/2014 | Swain | B64D 11/0023 |
| | | | | 29/401.1 |
| 2014/0224930 | A1 * | 8/2014 | Ivester | B64D 11/04 |
| | | | | 244/118.5 |
| 2014/0291445 | A1 * | 10/2014 | Brauer | B64D 11/0691 |
| | | | | 244/118.5 |
| 2014/0291446 | A1 * | 10/2014 | Reams | B64D 11/02 |
| | | | | 244/118.5 |
| 2014/0360099 | A1 * | 12/2014 | McIntosh | E03D 11/00 |
| | | | | 29/401.1 |
| 2015/0096118 | A1 * | 4/2015 | McIntosh | B64D 11/02 |
| | | | | 4/300 |
| 2016/0039522 | A1 | 2/2016 | Koyama et al. | |
| 2016/0332718 | A1 * | 11/2016 | Guering | B64D 45/0028 |
| 2017/0021929 | A1 * | 1/2017 | McKee | B64D 11/0691 |
| 2018/0251222 | A1 * | 9/2018 | Banfield | E04H 1/1216 |
| 2018/0346090 | A1 * | 12/2018 | Heidtmann | B64D 11/02 |
| 2019/0193859 | A1 | 6/2019 | Waldheuer et al. | |
| 2019/0248495 | A1 * | 8/2019 | Seibt | B64D 11/02 |
| 2020/0039626 | A1 * | 2/2020 | Johnson | B64D 11/062 |
| 2020/0115029 | A1 * | 4/2020 | Movsesian | E05B 65/0035 |
| 2021/0276716 | A1 | 9/2021 | Nicholas et al. | |
| 2022/0212774 | A1 * | 7/2022 | Eisele | E04H 1/1266 |
| 2022/0212800 | A1 * | 7/2022 | Bradshaw | B64D 11/003 |
| 2022/0212801 | A1 * | 7/2022 | Bradshaw | B64D 11/02 |
| 2023/0013546 | A1 * | 1/2023 | Rodriguez-Conde | |
| | | | | F04B 39/121 |

FOREIGN PATENT DOCUMENTS

| | | | | |
|---|---|---|---|---|
| DE | 102018103099 | A1 * | 8/2019 | ............. B64D 11/02 |
| EP | 867365 | A2 * | 9/1998 | ............. B64D 11/02 |
| EP | 2511132 | A1 * | 10/2012 | ................ B60P 3/36 |
| EP | 2803578 | A1 * | 11/2014 | ........... B64C 1/1423 |
| EP | 2873616 | A1 * | 5/2015 | ......... B64D 11/0023 |
| EP | 2974960 | A1 | 1/2016 | |
| EP | 4023556 | A1 * | 7/2022 | ............. B64D 11/02 |
| EP | 3873311 | B1 * | 12/2023 | ............. B64D 11/02 |
| WO | 2014201397 | A1 | 12/2014 | |
| WO | 2016157081 | A1 | 10/2016 | |
| WO | 2020092325 | A1 | 5/2020 | |
| WO | WO-2021040615 | A1 * | 3/2021 | ............. B64D 11/02 |

* cited by examiner

EXPANDABLE LAVATORY AND CABIN CONFIGURATION INCLUDING DEDICATED SEATING AREA AND EXPANDABLE LAVATORY

RELATED APPLICATION AND INCORPORATION BY REFERENCE

This nonprovisional application claims the benefit of priority of U.S. Provisional Application No. 63/251,399 filed Oct. 1, 2021 and titled EXPANDABLE LAVATORY AND CABIN CONFIGURATION INCLUDING DEDICATED SEATING AREA AND EXPANDABLE LAVATORY, the entirety of which is incorporated by reference.

TECHNICAL FIELD

The present disclosure relates generally to vehicle cabin configurations for accommodating passengers with reduced mobility (PRM), and more particularly, to an expandable lavatory and cabin configuration including an expandable lavatory positioned in relation to a dedicated seating area for PRM passengers, wherein the lavatory is reconfigurable to increase the lavatory footprint and to provide a second lavatory entrance dedicated for use by PRM passengers, for instance PRM passengers confined to a wheelchair.

BACKGROUND

The majority of traveling passengers can board a plane or other conveyance on their own and make use of standard passenger seats and lavatories. PRM passengers, for instance passengers confined to a wheelchair, require special boarding procedures and accommodations. For example, regarding passenger aircraft, part of the special boarding procedures involves transferring a passenger from their own personal wheelchair to a transfer wheelchair able to traverse a narrow aircraft aisle. Such transfer is not only disruptive to the passenger, but transfer wheelchairs are not catered to specific passenger needs and cannot be used for seating during flight. Thus, the PRM passenger must be transferred a second time from the transfer wheelchair to a standard passenger seat, further disrupting the passenger.

Conventional lavatories are also incapable of accommodating a wheelchair due their small size, narrow entrance door, and difficulty transitioning from the longitudinal aisle into the lavatory. In addition, small lavatories are not able to accommodate both a PRM passenger and their caregiver at the same time. While solutions have been developed for temporarily expanding a lavatory, such solutions typically involve increasing the width of the longitudinal aisle entrance. For example, in the case of adjacent lavatories, prior art solutions include a dividing wall repositionable to expand the size of one lavatory at the expense of the adjacent lavatory. While well-intentioned, such solutions are limited in their amount of possible expansion, continue to require access from the longitudinal aisle, and prevent use of the contracted lavatory when the adjacent lavatory is expanded.

Therefore, to minimize disruption to all traveling passengers while better catering to PRM passenger needs, it would be desirable to allow a wheelchair user to remain in their own personal wheelchair during boarding, travel and when accessing a lavatory. It would also be desirable to position the PRM passenger near a lavatory, and to provide a lavatory reconfigurable to allow direct access from a dedicated seating area without having to traverse a longitudinal aisle, crew area, or other heavily trafficked area of a passenger cabin.

BRIEF SUMMARY OF THE INVENTIVE ASPECTS

To achieve the foregoing and other advantages, in one aspect the present disclosure provides an aircraft cabin configuration including an interior space formed between a fuselage wall and a longitudinal aisle. An exit pathway leading to an exit door divides the interior space into a first portion and a second portion. A seating area positioned in the first portion of the interior space includes at least one passenger seat and a wheelchair securement area is positioned to one side of the at least one passenger seat. An expandable lavatory is positioned in the second portion of the interior space. In a first, non-expanded configuration, the lavatory can be used by passengers without mobility constraints. In a second, expanded configuration, the lavatory is further accessible to passengers with mobility constraints, for instance wheelchair-bound passengers.

In embodiments, the expandable lavatory includes first, second and third walls forming a lavatory interior, the first wall is positioned across the interior space, the second wall is positioned along the longitudinal aisle, and the third wall is repositionable between a first position in which the third wall is positioned across the interior space and a second position in which the third wall is positioned along the longitudinal aisle. A first door is positioned in the second wall for providing access to the lavatory interior from the longitudinal aisle. A second door is pivotally attached to the third wall and deploys across the interior space when the third wall is in the second position. The second door, when deployed, provides access to the lavatory interior from the exit pathway. A footprint of the lavatory interior is greater when the third wall is in the second position, and the second door, when deployed across the interior space, is longitudinally aligned with the wheelchair securement area.

In some embodiments, the expandable lavatory further includes a fourth wall positioned partway across the interior space, the fourth wall aligned with the second door when the second is deployed across the interior space.

In some embodiments, the seating area includes a plurality of passenger seats, wherein at least a portion of at least one of the plurality of passenger seats is removable or reconfigurable to clear a portion of the wheelchair securement area.

In some embodiments, the expandable lavatory further includes a first deployable privacy panel configured to deploy to fill a space between a top of the third wall and a ceiling of the aircraft cabin when the third wall is in the second position of the third wall, and a second deployable privacy panel configured to deploy to fill a space between a top of the second door and the ceiling of the aircraft cabin when the second door is deployed across the interior space.

In some embodiments, the expandable partition further includes at least one cabin attendant seat carried on the third wall, wherein the at least one cabin attendant seat is positioned along the exit pathway when the third wall is positioned across the interior space, and wherein the at least one cabin attendant seat is positioned along the longitudinal aisle when the third wall is positioned along the longitudinal aisle.

In some embodiments, the first wall is fixed, the second wall is perpendicular to the first wall, the third wall is perpendicular to the second wall when the third wall is in the first position, and the third wall is parallel to the second wall when the third wall is in the second position.

In some embodiments, the cabin configuration further includes a privacy partition positioned to one side of the seating area adjacent the wheelchair securement area, the privacy partition longitudinally aligned with and extending in a direction of the second wall.

In some embodiments, the lavatory includes a sink positioned along the fuselage wall and a toilet positioned to one side of the sink, wherein the toilet is not longitudinally aligned with the wheelchair securement area.

In some embodiments, the lavatory toilet is angled toward the second wall or angled toward the fuselage wall.

In another aspect, the present disclosure provides an expandable lavatory configured for installation in a vehicle including an interior space formed between an exterior wall and a longitudinal aisle. The expandable lavatory includes first, second and third walls forming a lavatory interior, the first wall positionable across the interior space, the second wall positionable along the longitudinal aisle, and the third wall repositionable between a first position in which the third wall is positionable across the interior space and a second position in which the third wall is positionable along the longitudinal aisle. A first door is positioned in the second wall for providing access to the lavatory interior from the longitudinal aisle. A second door is pivotally attached to the third wall such that the second door is deployable across the interior space when the third wall is in the second position, and the second door when deployed providing access to the lavatory interior from an exit pathway positioned across the interior space. A footprint of the lavatory interior is greater when the third wall is in the second position in order to accommodate passengers with mobility issues.

In some embodiments, the expandable lavatory includes a fourth wall positioned partway across the interior space, the fourth wall aligned with the second door when the second is deployed across the interior space.

In some embodiments, the expandable lavatory includes a sink positioned in the lavatory interior and a toilet positioned to one side of the sink, wherein the toilet is parallel to the second wall or angled toward the second wall.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides embodiments of passenger cabin configurations, dedicating seating areas for PRM passengers, and expandable lavatories with direct access for PRM passengers.

Figure 1:
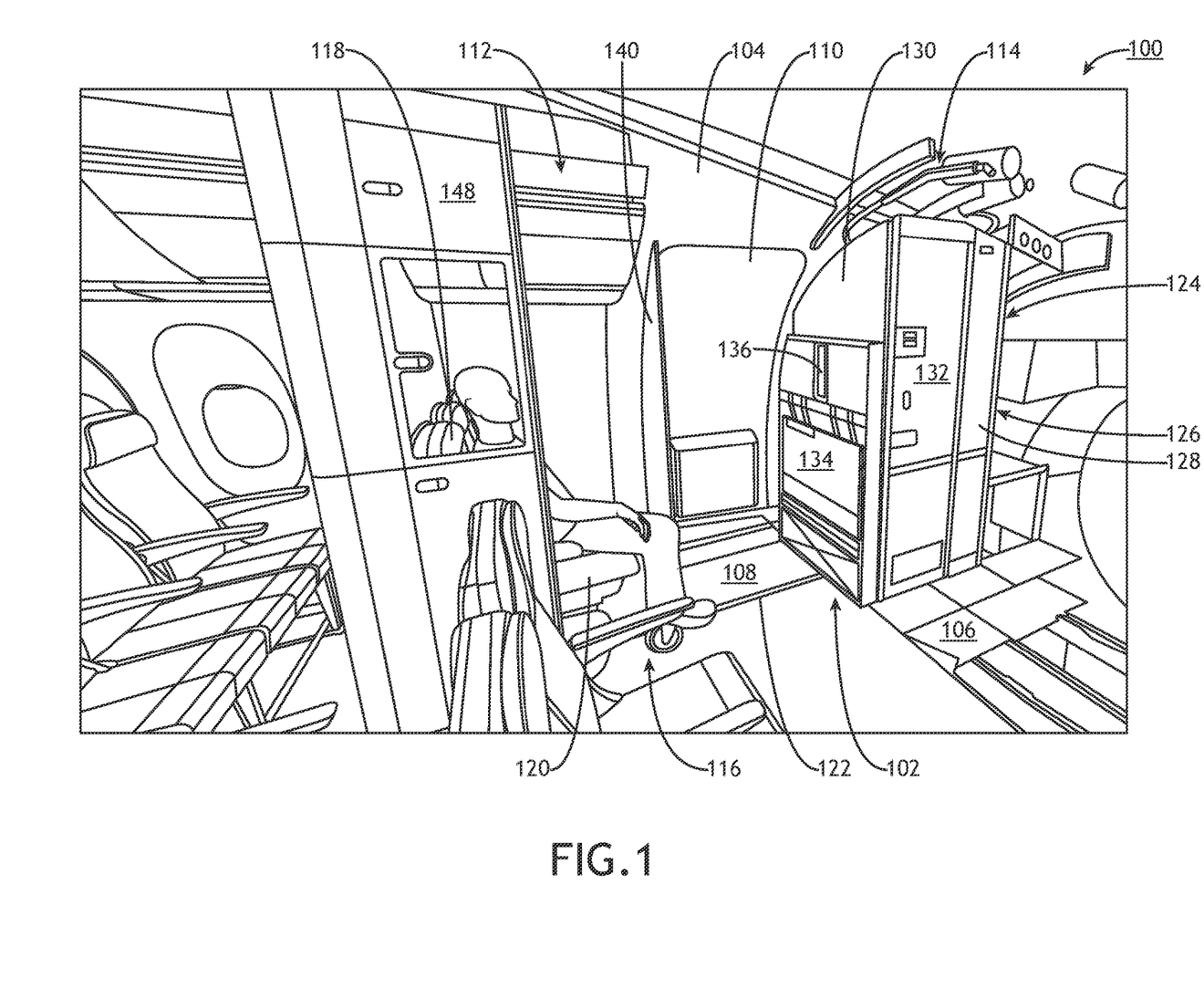
FIG. 1 is a perspective view of a portion of an aircraft cabin including a wheelchair securement area positioned relative to an expandable lavatory in accordance with an embodiment of the present disclosure.
Figure 2:
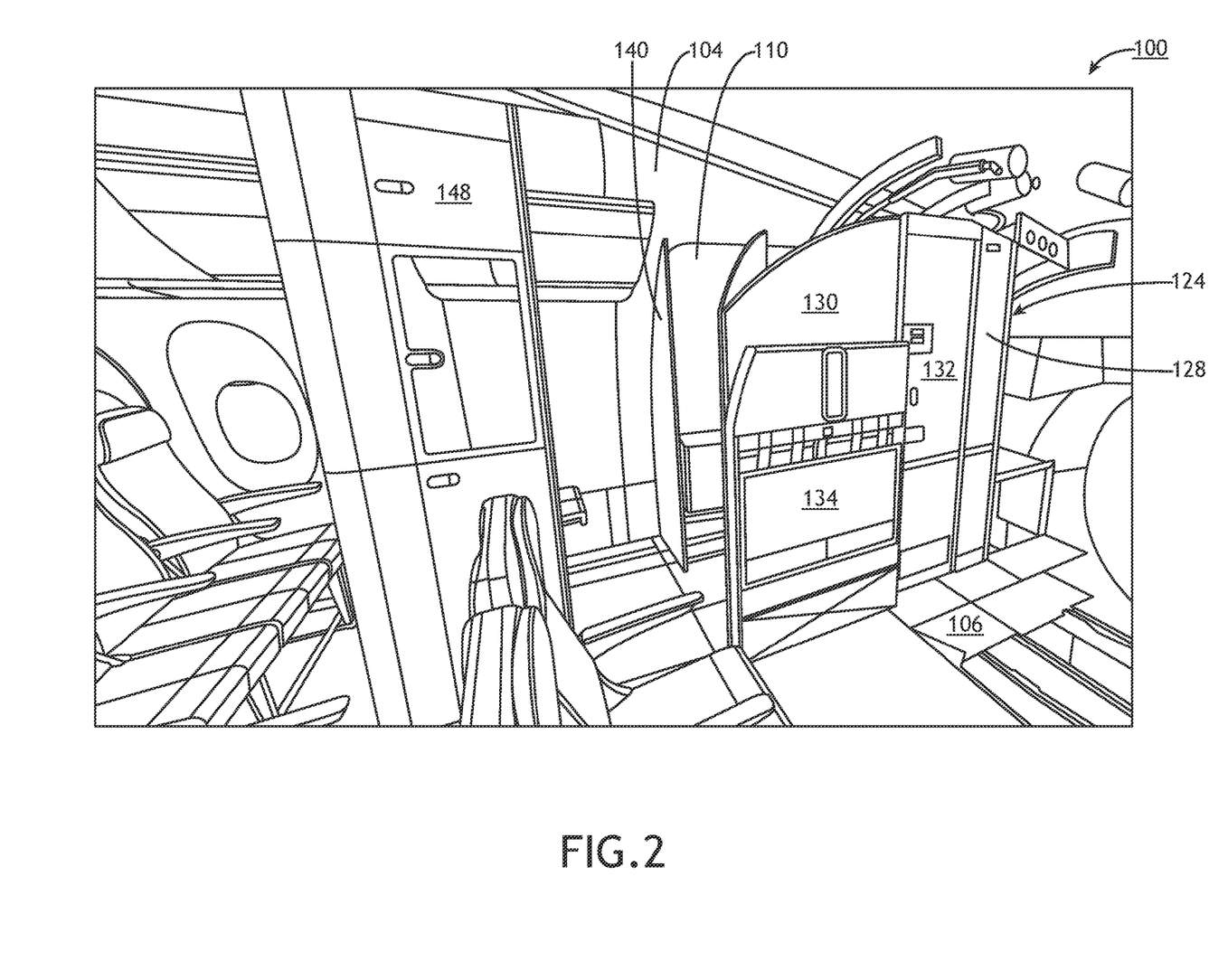
FIG. 2 is a perspective view of the aircraft cabin of FIG. 1 showing the expandable lavatory in a partially expanded configuration and with the second access door open.
Figure 3:
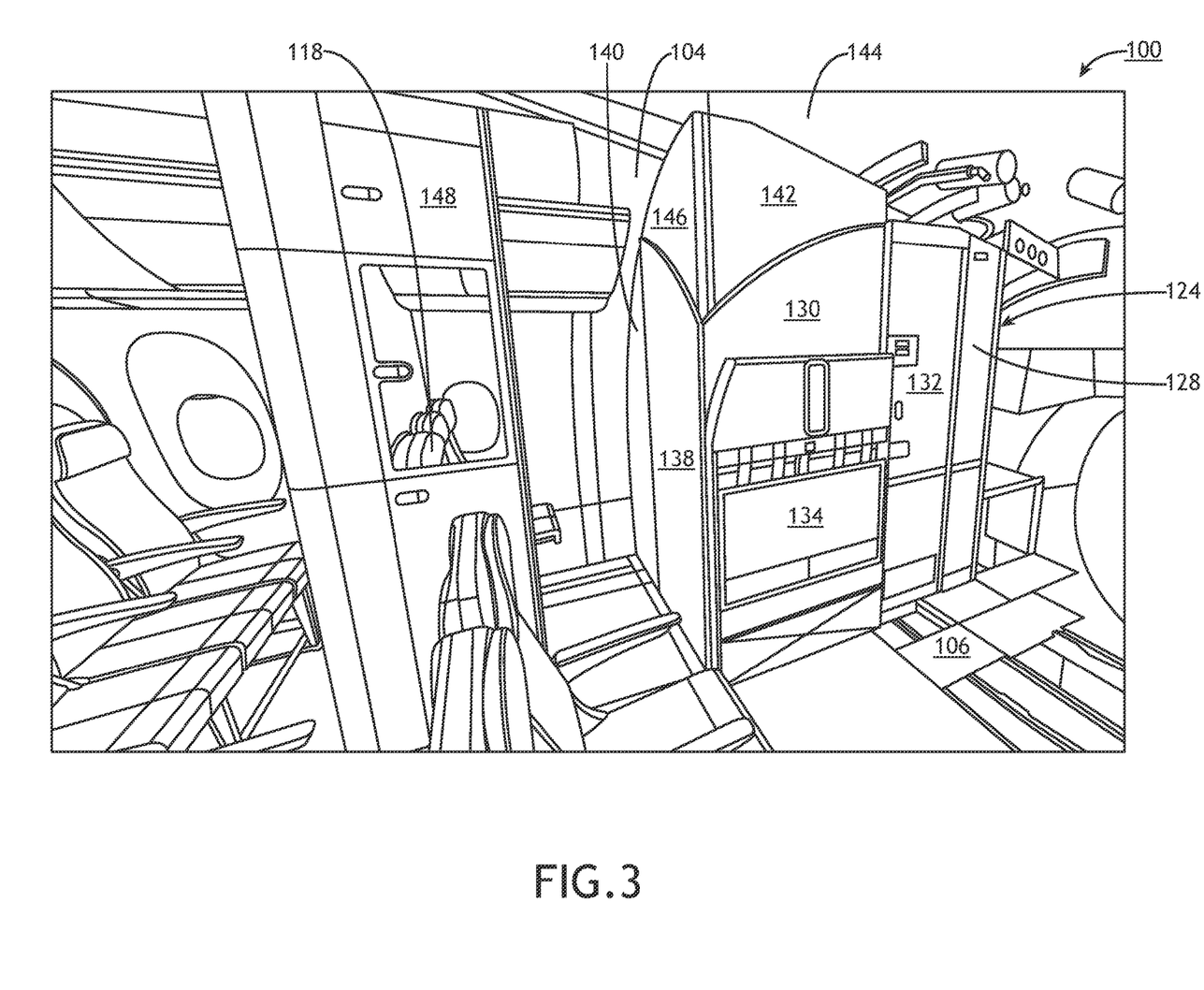
FIG. 3 is a perspective view of the aircraft cabin of FIG. 1 showing the expandable lavatory in a fully expanded configuration and with the second access door closed.

FIGS. 1-3 illustrate a passenger cabin, for example an aircraft passenger cabin, including a dedicated PRM passenger seating area and expandable lavatory. The passenger cabin 100 includes an interior space 102 formed between a fuselage wall 104 and a longitudinal aisle 106. The interior space 102 extends longitudinally along a portion of the length of the passenger cabin 100 and along one side of the longitudinal aisle 106. The interior space 102 is divided by a transverse exit pathway 108 leading to an exit door 110 provided along the fuselage wall 104. The transverse exit pathway 108 divides the interior space 102 into a first portion 112 and a second portion 114, not necessarily equally dimensioned.

A seating area 116 positioned in the first portion 112 includes at least one passenger seat 118. As shown, in some embodiments each passenger seat 118 is an economy class seat forming part of a seat row. The seating area 116 in the first portion 112, when configured for wheelchair securement, is dedicated for use by a PRM passenger and a caregiver or an accompanying passenger. Additional seats rows may be positioned in the cabin outside of the first portion 112, for instance aft of the seating area 116 and/or to one side of the seating area 116 across the longitudinal aisle 106.

With specific reference to FIG. 1, the seating area 116 includes a row of passenger seats wherein at least one of the passenger seats 118, and preferably two of the passenger seats, are removable at least in part, or reconfigurable, to clear floor space for receiving a wheelchair 120. Floor tracks 122 and seat frame elements may serve as anchoring locations for attaching straps or other elements for securing the wheelchair 120 in place during flight. As shown, the floor tracks 122 extend in the longitudinal direction from the seating area 116 in the direction of the expandable lavatory 124. When secured during flight, the wheelchair 120 is positioned just aft of the exit pathway 108 such that the exit pathway remains unobstructed.

The expandable lavatory 124 is positioned in the second portion 114. As shown in FIG. 1, the expandable lavatory 124 is in a first configuration for use by passengers without mobility issues. In other words, the typical or conventional lavatory use configuration. The expandable lavatory 124 generally includes first, second and third walls forming a lavatory interior. The first wall (see FIGS. 5-7 at 126) is a transverse wall extending across the interior space, for instance from the fuselage wall 104 to the longitudinal aisle 106. The second wall 128, which may be coupled to and/or continuous with the first wall, extends in the longitudinal direction along one side of the longitudinal aisle 106. The third wall 130, which in some embodiments is pivotally coupled to the second wall 128, extends across the interior space when in a first position as shown in FIG. 1, and extends along the longitudinal aisle 106 and parallel to the second wall 128 when pivoted to a second position as shown in FIG. 2. The first position of the third wall 130 shown in FIG. 1 corresponds to a retracted or conventional configuration of the lavatory 124, while the second position of the third wall 130 corresponds to an expanded lavatory configuration as shown in FIG. 2.

A first door 132 is positioned in the second wall 128 and swings open to provide access into the lavatory directly from the longitudinal aisle 106. In some embodiments, the lavatory entrance via the first door 132 is fixed in width and the width is insufficient to allow passage of a wheelchair. In some embodiments, the first and second walls 126, 128 are also positionally fixed. In some embodiments, the third wall 130 carries crew elements on an exterior side of the third wall, i.e., outside of the lavatory interior. The crew elements may include, but are not limited to, cabin attendant seats 134, a cabin information display system (CIDS) 136, etc. When the third wall 130 is in the first position as shown in FIG. 1, the crew elements are positioned in the exit pathway 108 such that the cabin attendant seat bottoms deploy into the exit pathway 108. When the third wall 130 is in the second position as shown in FIG. 2, the cabin attendant seat bottoms deploy into the longitudinal aisle 106 for use during air turbulence and otherwise when the expanded lavatory is in use.

With specific reference to FIG. 3, a second door 138 is pivotally attached to the third wall 130. The second door 138 is configured to swing open to provide access into the lavatory interior from the exit pathway 108. In use, lavatory expansion includes in a first step moving (e.g., pivoting) the third wall 130 from its first position across the interior space to its second position parallel to the longitudinal aisle and in some embodiments in line with the second wall 128. In a second step, the second door 138 is pivoted away from the third wall 130, hinged along one edge, to a closed position in which the closed door extends across the interior space. In some embodiments, the door length is less than the width of the interior space (i.e., from the fuselage wall 104 to the longitudinal aisle 106) and a fourth wall 140 is provided to fill the space between the fuselage wall 104 and closed second door 138, as shown in FIG. 3.

As shown in FIG. 3, in some embodiments the third wall 130 is curved along the top edge to generally conform to the curvature of the fuselage wall 104 when the third wall 130 is in the first position. The second door 138 may have a similar curvature such that the curvatures of the third wall 130 and the second door 138 align with the second door 138 is in the first position and the second door is stowed face to face against the third wall 130. In some embodiments, a first deployable partition 142 is provided to fill the space between the top edge of the third wall 130 and the ceiling 144 when the third door is in the second position, and a second deployable partition 146 is provided to fill the space between the top edge of the second door 138 and the ceiling 144 when the second door is deployed. In some embodiments, the first and second deployable partitions 142, 146 are integrally formed. In some embodiments, the first and second deployable partitions 142, 146 are separate and separately deployable. Each of the deployable partitions 142, 146 may be carried on their respective lavatory element, may be attached to the ceiling 144, or may be stowed elsewhere and installed as needed. In some embodiments, the height of the third wall 130 and the height of the second door 138 are sufficient to obviate the need for space-filling privacy partitions. In some embodiments, a privacy partition 148 is positioned to one side of the seating area, the privacy partition 148 positioned along the longitudinal aisle 106 and extending in a direction of the expandable lavatory 124. In some embodiments, the privacy partition 148 includes at least one of storage compartments and a window.

Figure 4:
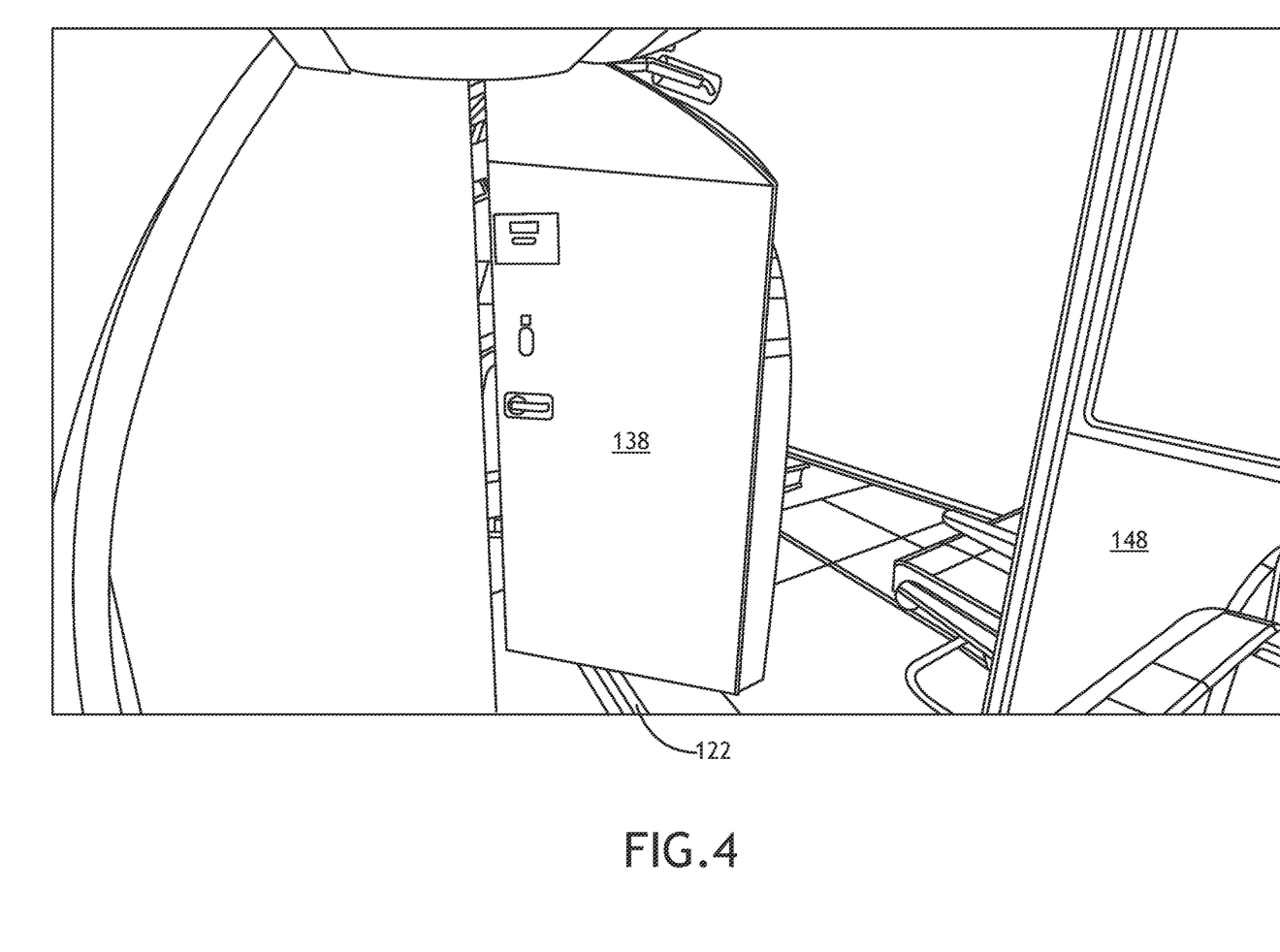
FIG. 4 is a perspective view from the seating area into the expanded lavatory.

FIG. 4 shows a view from the dedicated PRM seating area into the expanded lavatory through the second door 138. As shown, the floor tracks 122 extend from the seating area into the lavatory. In some embodiments, the wheelchair always remains attached to the floor tracks 122. Also shown is the optional privacy partition 148 positioned alongside the seating area, and more particularly, alongside a convertible passenger seat as discussed below.

Figure 5A:
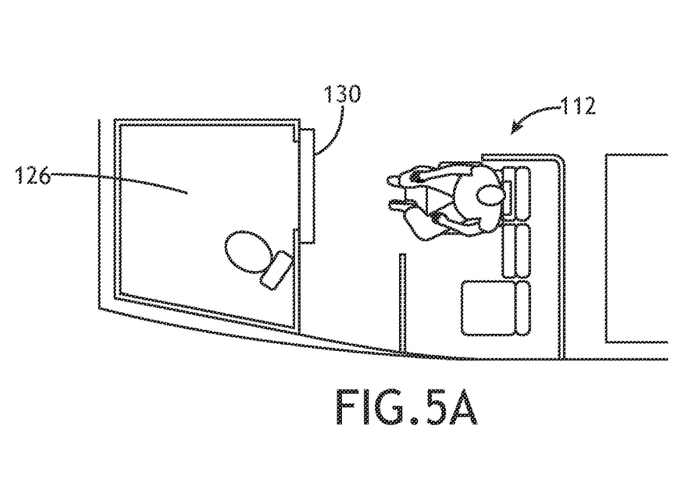
FIGS. 5A-5D are sequential views showing the expandable lavatory being expanded and a reduced mobility passenger traversing from the seating area into the expanded lavatory.
Figure 5B:
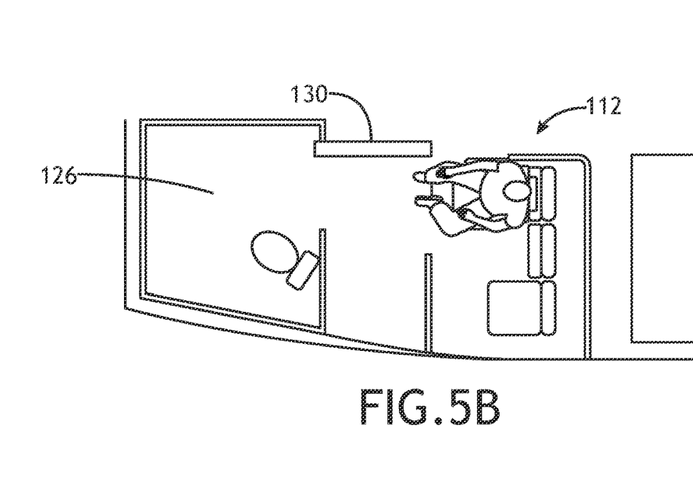
Figure 5C:
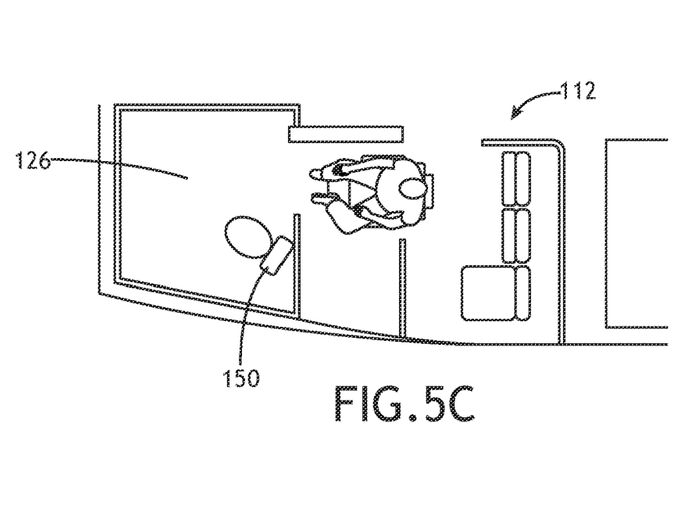
Figure 5D:
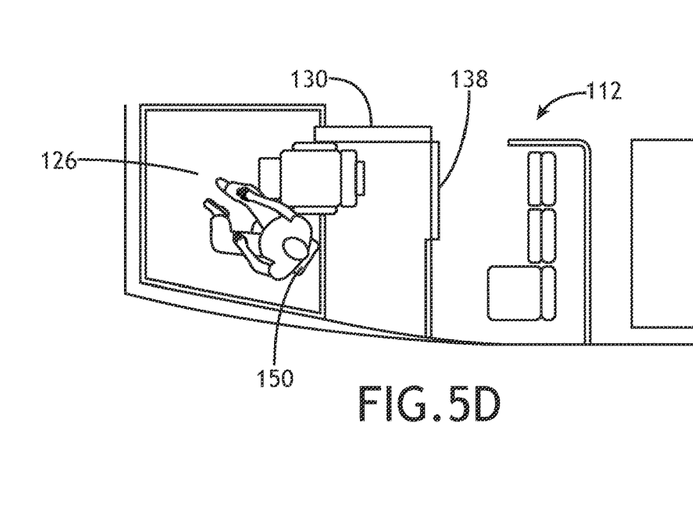

FIGS. 5A-5D illustrate the steps involved with lavatory expansion and lavatory ingress. FIG. 5A shows a PRM passenger confined to a wheelchair, the PRM passenger positioned in the dedicated seating area 112 during flight, and the expandable lavatory in a contracted or conventional configuration. FIG. 5B shows the third wall 130 moved to the 'open' position to expand the lavatory interior. FIG. 5C shows the PRM passenger moving into the expanded lavatory. FIG. 5D shows the PRM passenger fully in the expanded lavatory, and with the second door 138 in the closed position. Apparent from FIG. 5D, the PRM passenger seat position and the second door 138 are longitudinally aligned such that the PRM passenger can move straight forward to enter the expanded lavatory to position the wheelchair laterally adjacent the toilet 150 to facilitate easy transfer from the wheelchair to the toilet and back. A comparison of FIGS. 5A and 5D further shows the difference in footprint size between the contracted configuration of the lavatory as shown in FIG. 5A and the expanded configuration of the lavatory as shown in FIG. 5D. FIG. 5D further shows the lavatory footprint capable of accommodating both the PRM passenger and a caregiver, and the privacy of the expanded lavatory.

Figure 6:
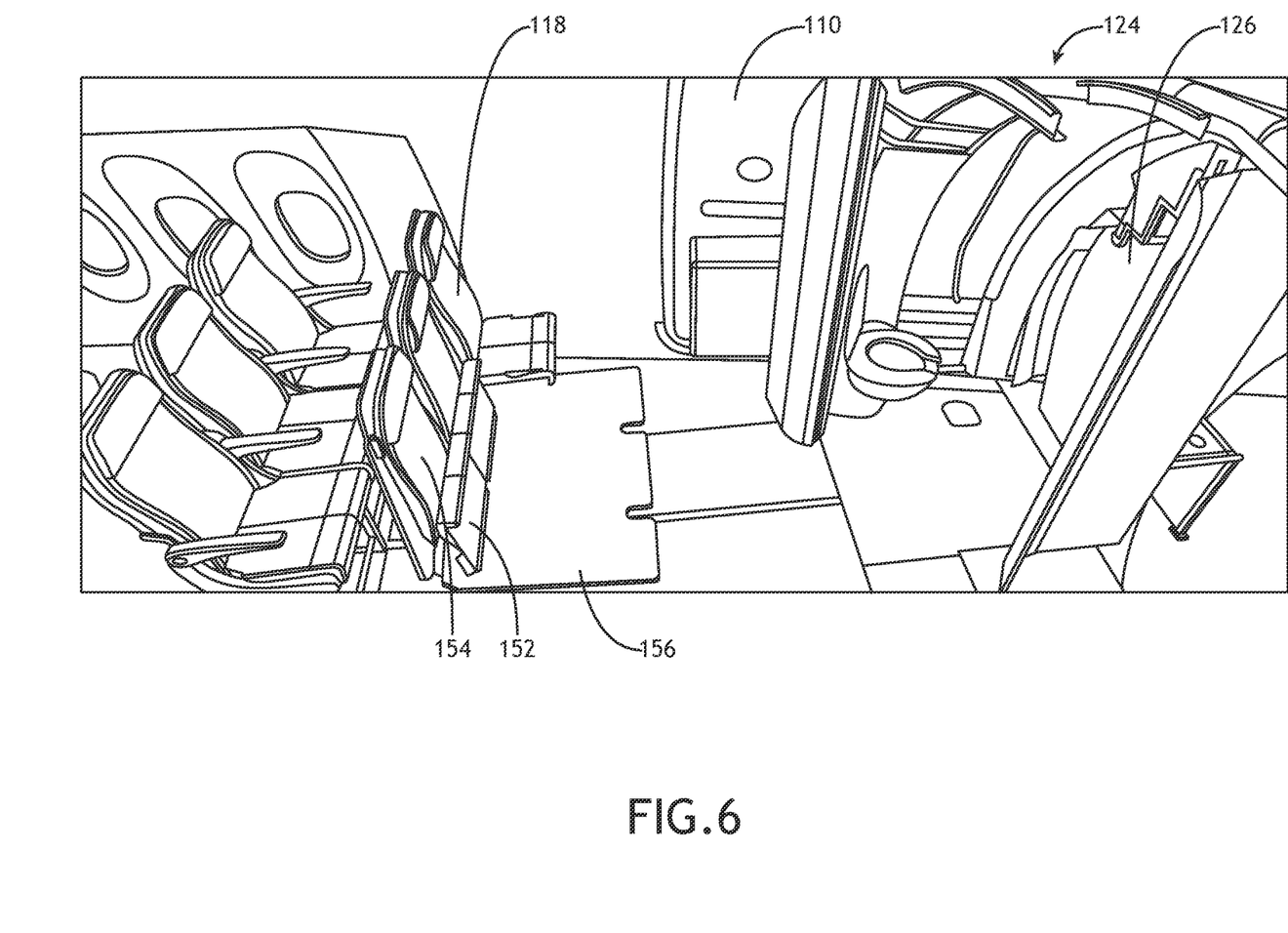
FIG. 6 is a perspective view of a portion of an aircraft cabin showing a lavatory open to permit wheelchair access.

FIG. 6 shows another embodiment of a PRM accessible lavatory 124. As shown, the seating area includes a row of seats 118 each seat equipped with a flip-up seat bottom 152 configured to stow against its respective seat back 154 to clear space in the seating area to accommodate a wheelchair. In some embodiments, the dedicated seating area occupies a portion of a conventional passenger seating area such that the dedicated seating area is visually indistinguishable from an adjacent conventional passenger seating area when the dedicated seating area is used for conventional passenger seating. Seat components such as seat backs, armrests and headrests may be the same or similar in both the conventional passenger seating zone and the dedicated seating area for visual consistency throughout the passenger cabin. The dedicated seating area may be positioned in any location within the aircraft cabin but is preferably positioned directly longitudinally adjacent the expandable lavatory 124 as shown.

Figure 7:
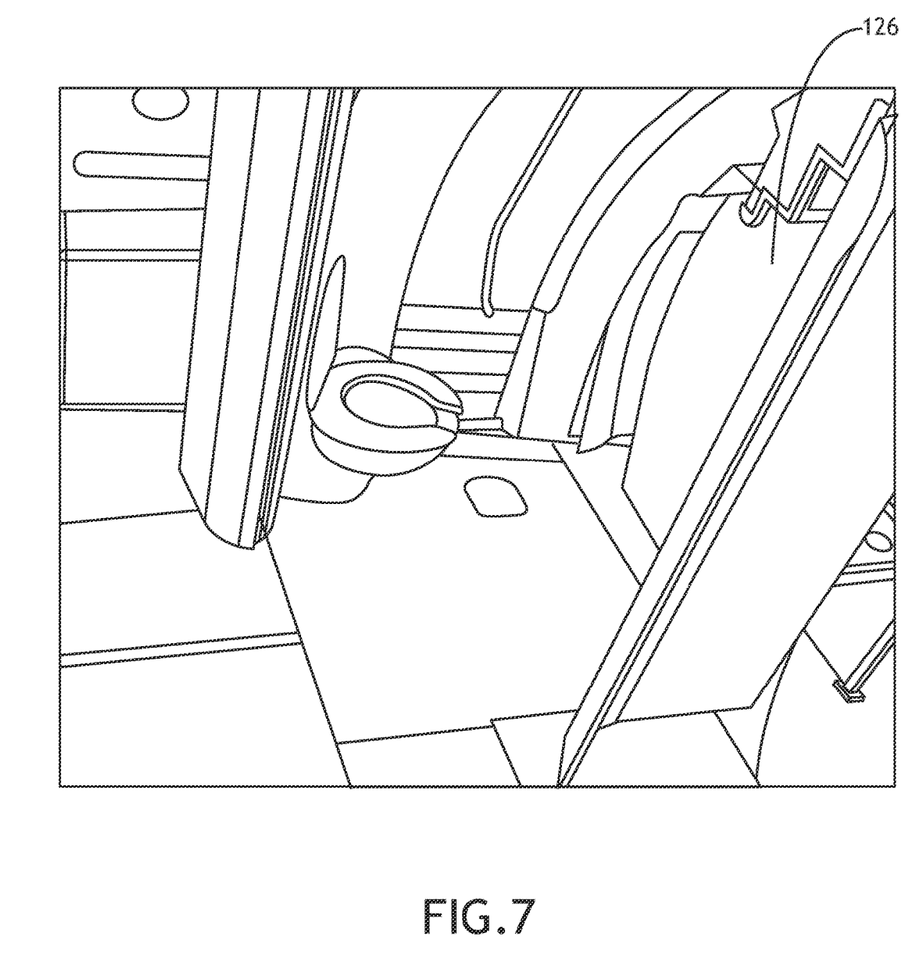
FIG. 7 is a perspective view of the lavatory shown in FIG. 6 showing the passenger moved from the wheelchair to the toilet.

In some embodiments, the seat row is positioned on a floor pallet 156 installable in the dedicated seating area and sized to substantially correspond to the footprint of the dedicated seating area. The floor pallet 156 may be unitary or multi-piece to facilitate installation and depending on the footprint of the dedicated seating area. The floor pallet 156 preferably has a lightweight construction, is resistant to deformation, transfer loads on restraint assemblies to the floor, and has a thin vertical profile. FIG. 6 illustrates two of the three passenger seats with their seat bottoms 152 positioned to accommodate a wheelchair in the dedicated seating area. FIG. 6 further shows the PRM passenger moving into the expandable lavatory 124 via an expanded access opening. FIG. 7 shows the PRM passenger wheelchair fully in the expanded lavatory and with the passenger transferred from the wheelchair to the toilet.

Figure 8:
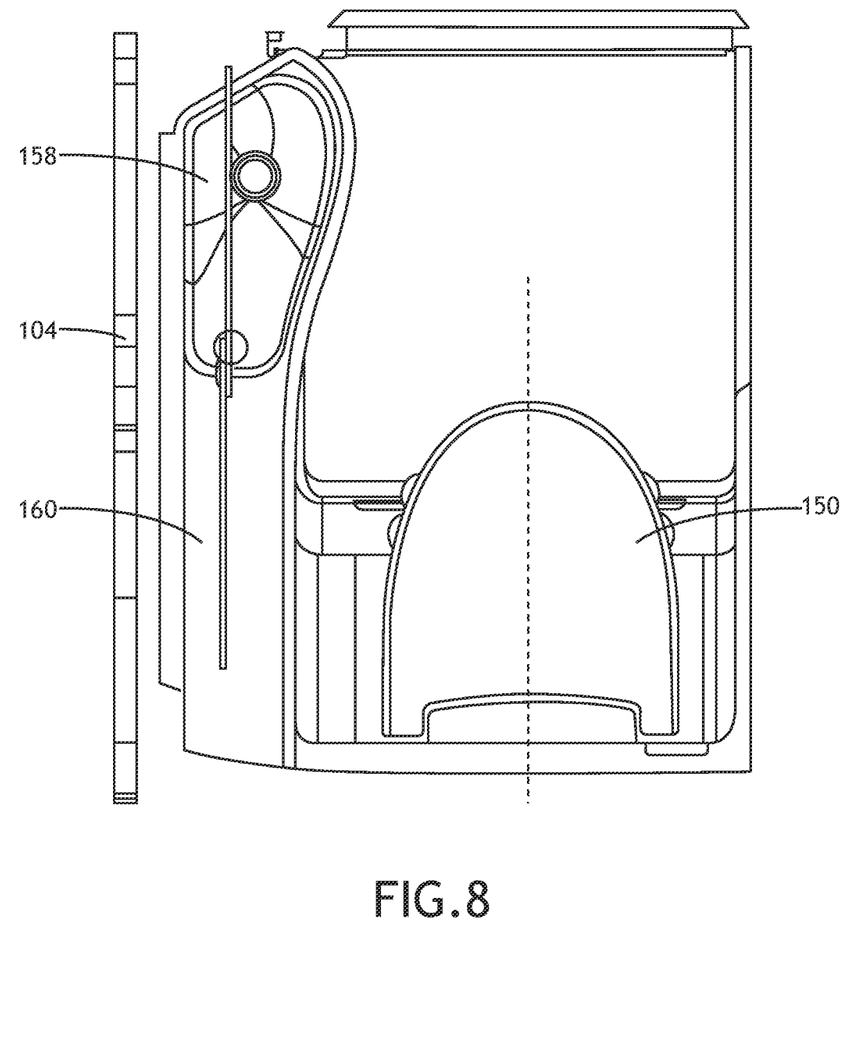
FIG. 8 is a top plan view of a lavatory showing a positional relationship of a toilet and sink according to a first embodiment of the present disclosure.
Figure 9:
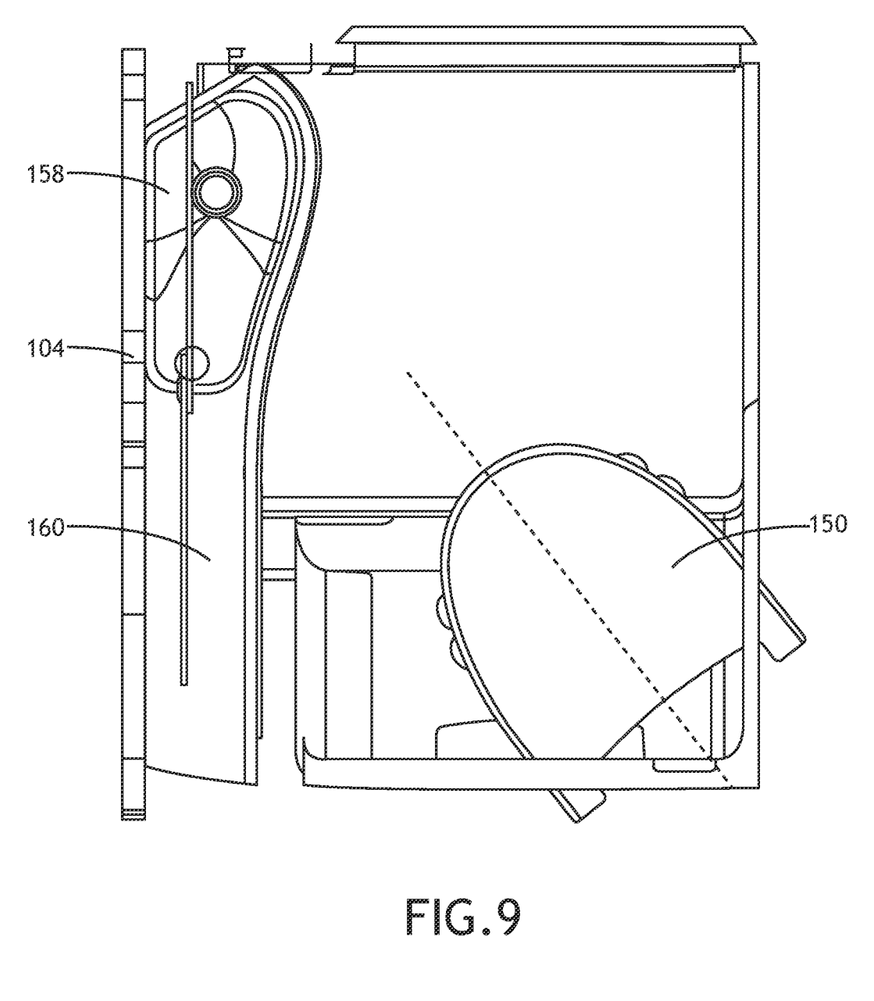
FIG. 9 is a top plan view of a lavatory showing a positional relationship of an angled toilet and sink according to a second embodiment of the present disclosure.

FIG. 8 shows a first embodiment of a lavatory interior including a sink 158 positioned adjacent the fuselage wall 104, a counter 160 coextensive with a portion of the fuselage wall 104 and transitioning into the sink 158, and the toilet 150 positioned to the side of the counter 160. The toilet 150 is parallel to the longitudinal aisle. FIG. 9 shows a second embodiment of a lavatory interior, similar to the first embodiment, but with the toilet 150 angled toward the fuselage wall 104.

Figure 10A:
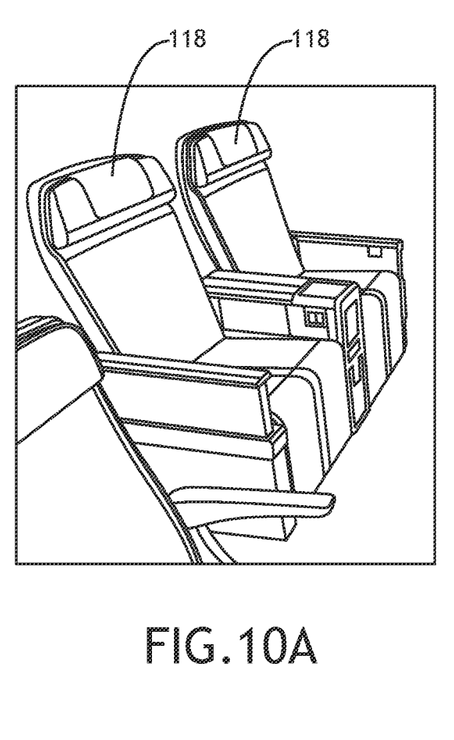
FIGS. 10A-10C shows the sequential steps for converting a business class seat to accommodate a wheelchair in the dedicated seating area.
Figure 10B:
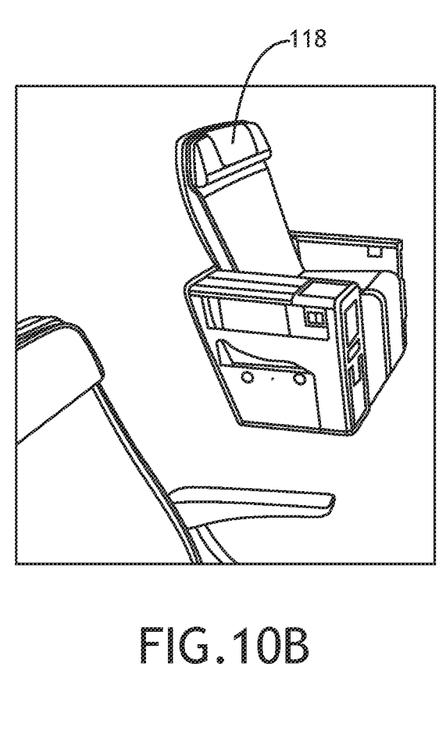
Figure 10C:
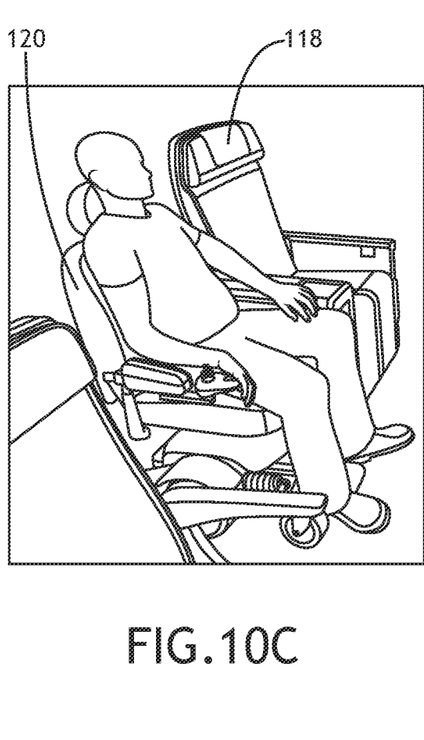

FIGS. 10A-10C show the sequential steps for converting a business class seat in the dedicated seating area to receive a wheelchair. FIG. 10A shows two laterally adjacent business class passenger seats 118 configured for passenger seating. FIG. 10B shows the aisle passenger seat 118 removed entirely, or a portion thereof removed, to clear space in the dedicated seat area to receive a wheelchair. FIG. 10C shows a wheelchair 120 positioned in the dedicated passenger seating area laterally adjacent the window seat. The window seat may be occupied by a caregiver of the PRM passenger or another traveling passenger. Although not shown, the aisle seat is preferably longitudinally aligned with the lavatory door for accessing the lavatory interior in the expanded configuration of the lavatory. In some embodiments, a dedicated storage area may be provided in the aircraft cabin for accommodating the removed seat or removed components of the seat.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft cabin, comprising:
an interior space formed between a fuselage wall and a longitudinal aisle;
an exit pathway leading to an exit door, the exit pathway dividing the interior space into a first portion and a second portion;
a seating area positioned in the first portion of the interior space and including at least one passenger seat and a wheelchair securement area positioned to one side of the at least one passenger seat; and
an expandable lavatory positioned in the second portion of the interior space;
wherein the expandable lavatory comprises:
first, second and third walls forming a lavatory interior, the first wall positioned across the interior space, the second wall positioned along the longitudinal aisle, and the third wall repositionable between a first position in which the third wall is positioned across the interior space and a second position in which the third wall is positioned along the longitudinal aisle;
a first door positioned in the second wall, the first door providing access to the lavatory interior from the longitudinal aisle; and
a second door pivotally attached to the third wall, the second door deployable across the interior space when the third wall is in the second position of the third wall, and the second door when deployed providing access to the lavatory interior from the exit pathway;
wherein a footprint of the lavatory interior is greater when the third wall is in the second position of the third wall than in the first position of the third wall; and
wherein the second door, when deployed across the interior space, is longitudinally aligned with the wheelchair securement area.

2. The aircraft cabin according to claim 1, further comprising a fourth wall positioned partway across the interior space, the fourth wall aligned with the second door when the second is deployed across the interior space.

3. The aircraft cabin according to claim 1, wherein the seating area includes a plurality of passenger seats, and wherein at least a portion of at least one of the plurality of passenger seats is removable to form the wheelchair securement area.

4. The aircraft cabin according to claim 1, further comprising a first deployable privacy panel configured to deploy to fill a space between a top of the third wall and a ceiling of the aircraft cabin when the third wall is in the second position of the third wall, and a second deployable privacy panel configured to deploy to fill a space between a top of the second door and the ceiling of the aircraft cabin when the second door is deployed across the interior space.

5. The aircraft cabin according to claim 1, further comprising at least one cabin attendant seat carried on the third wall, wherein the at least one cabin attendant seat is positioned along the exit pathway when the third wall is positioned across the interior space, and wherein the at least one cabin attendant seat is positioned along the longitudinal aisle when the third wall is positioned along the longitudinal aisle.

6. The aircraft cabin according to claim 1, wherein the first wall is fixed, the second wall is perpendicular to the first wall, the third wall is perpendicular to the second wall when the third wall is in the first position, and the third wall is parallel to the second wall when the third wall is in the second position.

7. The aircraft cabin according to claim 1, further comprising a privacy partition positioned to one side of the seating area adjacent the wheelchair securement area, the privacy partition longitudinally aligned with and extending in a direction of the second wall.

8. The aircraft cabin according to claim 1, further comprising a sink positioned in the lavatory interior along the fuselage wall, and a toilet positioned to one side of the sink, wherein the toilet is not longitudinally aligned with the wheelchair securement area.

9. The aircraft cabin according to claim 8, wherein the toilet is angled toward the second wall.

10. An expandable lavatory configured for installation in a vehicle including an interior space formed between an exterior wall and a longitudinal aisle, the expandable lavatory comprising:
    first, second and third walls forming a lavatory interior, the first wall positionable across the interior space, the second wall positionable along the longitudinal aisle, and the third wall repositionable between a first position in which the third wall is positionable across the interior space and a second position in which the third wall is positionable along the longitudinal aisle;
    a first door positioned in the second wall, the first door providing access to the lavatory interior from the longitudinal aisle;
    a second door pivotally attached to the third wall, the second door deployable across the interior space when the third wall is in the second position, and the second door when deployed providing access to the lavatory interior from an exit pathway positioned across the interior space; and
    at least one of: a toilet; and a sink;
    wherein a footprint of the lavatory interior is greater when the third wall is in the second position than in the first position of the third wall; and
    wherein the greater footprint of the lavatory interior when the third wall is in the second position is configured to accommodate passengers with reduced mobility.

11. The expandable lavatory according to claim 10, further comprising a fourth wall positioned partway across the interior space, the fourth wall aligned with the second door when the second door is deployed across the interior space.

12. The expandable lavatory according to claim 10, further comprising a first deployable privacy panel configured to deploy to fill a space between a top of the third wall and a vehicle ceiling when the third wall is in the second position of the third wall, and a second deployable privacy panel configured to deploy to fill a space between a top of the second door and the vehicle ceiling when the second door is deployed across the interior space.

13. The expandable lavatory according to claim 10, further comprising at least one cabin attendant seat carried on the third wall, wherein the at least one cabin attendant seat is positioned along an exit pathway when the third wall is positioned across the interior space, and wherein the at least one cabin attendant seat is positioned along the longitudinal aisle when the third wall is positioned along the longitudinal aisle.

14. The expandable lavatory according to claim 10, wherein the first wall is fixed, the second wall is perpendicular to the first wall, the third wall is perpendicular to the second wall when the third wall is in the first position, and the third wall is parallel to the second wall when the third wall is in the second position.

15. The expandable lavatory according to claim 10, further comprising a sink positioned in the lavatory interior and a toilet positioned to one side of the sink, wherein the toilet is parallel to the second wall or angled toward the second wall.

* * * * *